United States Patent
Hedrick

[15] 3,674,281
[45] July 4, 1972

[54] TOOL CHUCK ASSEMBLY
[72] Inventor: John R. Hedrick, La Crescenta, Calif.
[73] Assignee: Pevrick Engineering Co., Inc., Sun Valley, Calif.
[22] Filed: Jan. 21, 1971
[21] Appl. No.: 108,466

[52] U.S. Cl.............................................279/30, 279/1 B
[51] Int. Cl.......................................................B23b 31/10
[58] Field of Search.....................................279/1 B, 22, 30

[56] References Cited
UNITED STATES PATENTS

| | | | |
|---|---|---|---|
| 3,398,965 | 8/1968 | Cox | 279/30 |
| 2,959,422 | 11/1960 | Manos | 279/30 |

Primary Examiner—Francis S. Husar
Attorney—Robert E. Geauque

[57] ABSTRACT

A tool chuck assembly to firmly retain the cylindrical stem of a tool wherein a plurality of ball elements are frictionally pressed against the stem by a wedge shaped sleeve, the sleeve being movable into and out of engagement with the balls by means of a manually actuatable lever.

8 Claims, 5 Drawing Figures

PATENTED JUL 4 1972
3,674,281
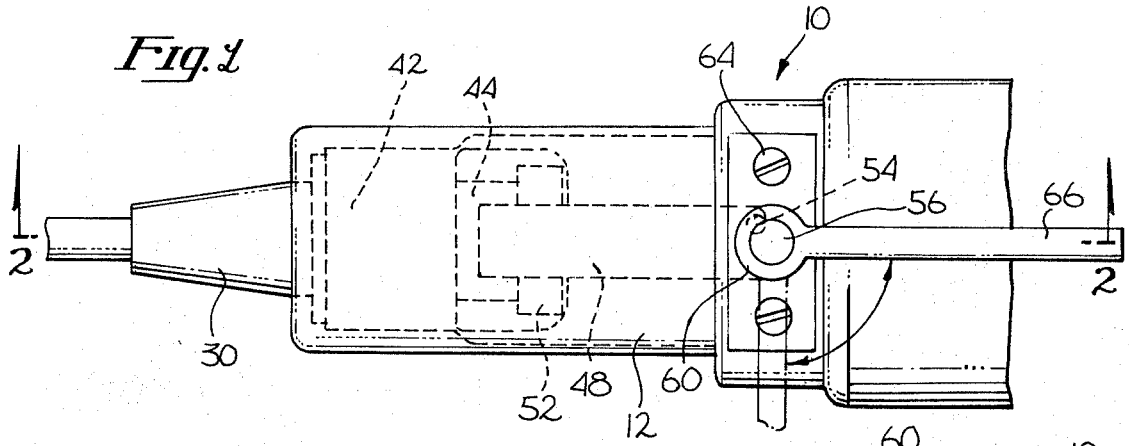
Fig. 1
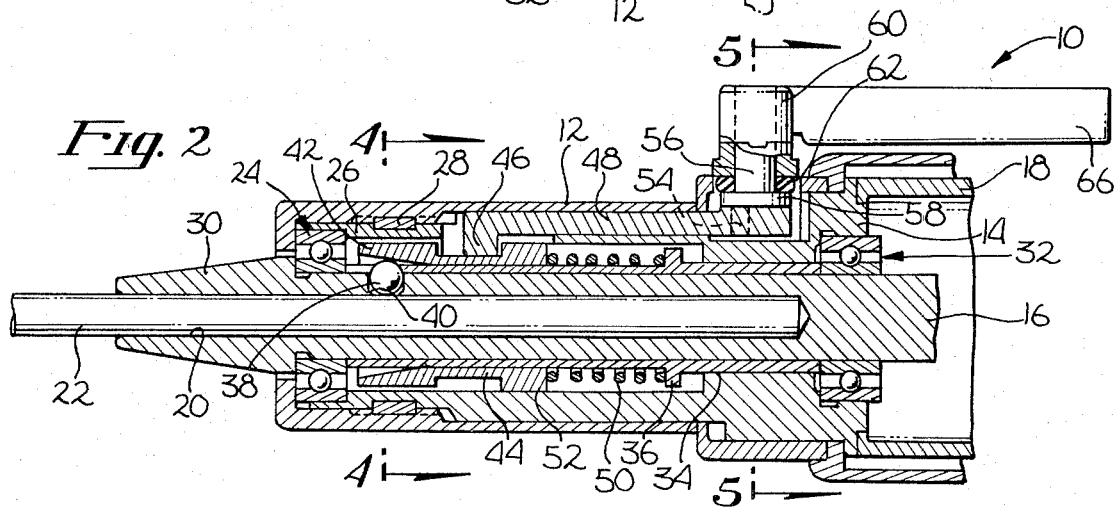
Fig. 2
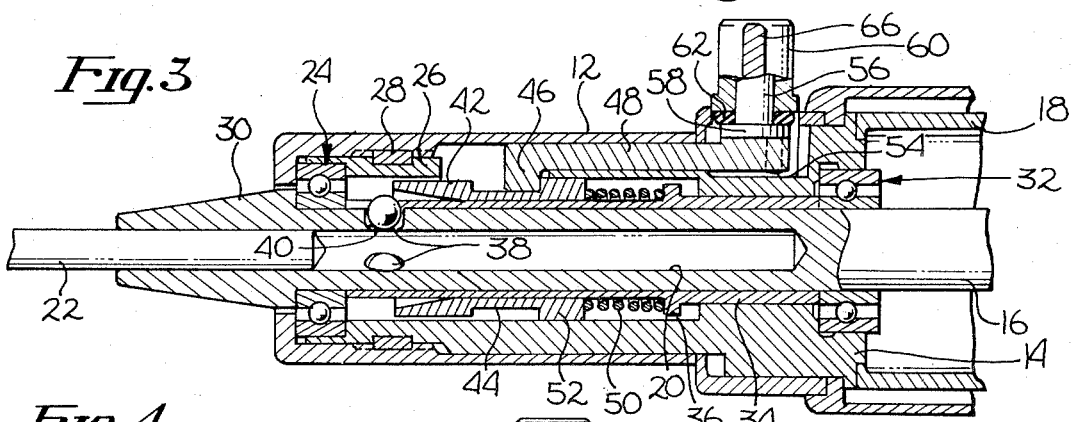
Fig. 3
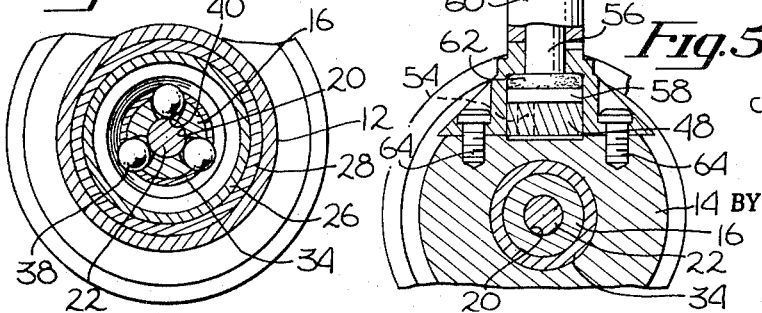
Fig. 4
Fig. 5
JOHN R. HEDRICK
INVENTOR
R. E. Geauque
ATTORNEY

TOOL CHUCK ASSEMBLY

BACKGROUND OF THE INVENTION

The field of this invention relates to tool holders and more particularly to a chuck assembly for a power driven tool structure to firmly retain the tool in cooperation with the power driven tool structure.

Power driven tool operating structures are in widespread use at the present time. Such structures normally take the form of a portable hand held motor assembly which effect rotation of a chuck assembly. The structure may include an electric motor or a pneumatically driven motor assembly. The chuck assembly is to cooperate with the cylindrical stem of a tool such as a drill, abrasive wheel, or the like and fixedly position such with respect to the chuck assembly. An example of such type of drills would be the electric drill which is employed in either home or manufacturing use. Another example of such a drill would be the pneumatically powered drill which is used by dentists for the purpose of drilling into a person's teeth to permit insertion of a metallic filling to eliminate continual tooth decay.

The common form of a chuck assembly to effect retention of the stem of a tool include a plurality of jaws which are to be movable into contact with the stem of the tool to frictionally hold the tool in cooperation with the chuck assembly. To effect the movement of these chuck jaws can prove to be a time consuming procedure. In certain environments it is desirable that the replacement of tools be effected easily and quickly as possible. The medical doctor or the dentist may be involved in an emergency situation where it is not desirable to lose time in the substituting of a different tool. The removal of the one tool should be accomplished in a single quick movement and the insertion of the other tool be also accomplished in a single quick movement. Further, the retaining force established by the chuck assembly should be sufficiently positive as to absolutely preclude accidental dislodgement of the tool from the chuck assembly or to permit any relative rotation between the tool and the chuck assembly.

It would be desirable to design a chuck assembly for a cylindrical stem of a rotatable tool which accomplishes the above noted objectives, and also is of simple construction thereby requiring low manufacturing cost and low maintenance cost.

SUMMARY OF THE INVENTION

The chuck assembly of this invention employs the use of a main driving shaft which includes a central aperture for receiving a cylindrical stem of a rotatable tool. A plurality of ball elements are associated within transverse apertures of the shaft and are capable of coming into contact with the stem of the tool. The ball elements extend radially exteriorly of the outer surface of the shaft and are capable of coming into contact with a wedge shaped sleeve. The sleeve is biased by a spring which normally locates the balls into contact with the stem. The sleeve is to be movable against the bias of the spring by means of a pivotable lever. A pin is secured to the lever structure eccentric from the pivotal axis of the lever. Upon pivoting movement of the lever the pin effects translational movement of the wedge shaped sleeve.

BRIEF DESCRIPTION OF THE DRAWING

FIG. 1 is a plan view of the chuck assembly of this invention showing the pivotable positions of the lever to effect translational movement of the wedge shaped sleeve;

FIG. 2 is a longitudinal cross sectional view through the chuck assembly of this invention taken along line 2—2 of FIG. 1;

FIG. 3 is a view similar to FIG. 2 but showing the balls not in contact with the cylindrical stem of the tool;

FIG. 4 is a sectional view through the friction ball retaining assembly employed within this invention taken along line 4—4 of FIG. 2; and FIG. 5 is a cross sectional view through the pivotal lever structure employed within this invention taken along line 5—5 of FIG. 2.

DETAILED DESCRIPTION OF THE SHOWN EMBODIMENT

Referring particularly to the drawing there is shown in FIG. 1 the chuck assembly 10 of this invention which includes a fixed outer housing 12, a fixed inner housing 14, and a rotatable shaft 16. The inner housing 14 is secured to the motor assembly housing 18. An electric or pneumatic motor is to be contained within the motor assembly housing 18, but such is deemed to be conventional and need not be shown here for purposes of the description of this invention. However, it is to be understood that the motor located within the motor assembly housing 18 is to effect rotational movement of the shaft 16.

The shaft 16 includes a longitudinal central opening 20 which is adapted to receive the cylindrical stem 22 of a tool in a snug fitting manner. It is to be understood that at the free end of the stem 22, a tool is to be formed or secured thereto such as a drill bit, grinding wheel, or the like. Again, such tools are deemed to be conventional and need not be shown here for purposes of the description of this invention.

The shaft 16 is rotatably supported by a first bearing assembly 24 with respect to the outer housing 12 within fixed sleeve 26. Sleeve 26 is fixedly located with respect to the housing 12 by means of ring 28. The fixed sleeve 26 is integrally secured to the inner housing 14. The first bearing assembly 24 is located directly adjacent the collet 30 of the chuck assembly 10.

The second bearing assembly 32 rotatably supports shaft 16 with respect to the inner housing 14 adjacent the motor assembly housing 18. Secured to the shaft 16 and located adjacent the second bearing assembly 32 is an inner sleeve 34. Inner sleeve 34 extends about shaft 16 substantially the entire spaced distance between the first bearing assembly 24 and the second bearing assembly 32.

Integrally secured to the inner sleeve 34 is a collar 36. Collar 36 is located nearer the second bearing assembly 32 than the first bearing assembly 24. Nearer the first bearing assembly 24 than the second bearing assembly 32 are formed a plurality of apertures within the inner sleeve 34. The apertures are to be equidistantly located about the inner sleeve 34 with each aperture to cooperate with a ball 38. It is to be noted that three in number of such balls 38 are shown, however any reasonable number could be employed. The size of the apertures within the inner sleeve 34 are such as to be slightly smaller in diameter than the diameter of the balls 38. Therefore, each of the apertures within the inner sleeve 34 prevent lineally outward movement of its respective ball 38 with respect to the sleeve 34.

Each of the balls 38 are located within an opening 40 formed within shaft 16. Each of the balls 38 are capable of coming into contact with the stem 22. A portion of each of the balls extend radially outward past the inner sleeve 34 and are capable of coming into contact with wedge shaped sleeve 42. It is important that the balls 38 be formed of an extremely hard material of construction such as stainless steel and also have a high surface finish. This decreases wear and permits the establishing of a high frictional contact between the balls 38 and the stem 22. Wedge shaped sleeve 42 includes an exterior annular recess 44. The head 46 of arm 48 is adapted to be located within the confines of the annular recess 44. A compression spring 50 is to be located between the collar 36 and the raised aft portion 52 of the wedge shaped sleeve 42.

Arm 48 includes an aperture which is to cooperate with pin 54. Pin 54 is pivotally mouted with respect to the arm 48. The pin 54 is fixedly secured to a pivot shaft 56. The location of pin 54 is eccentric to the axis of the pivot shaft 56. The pin 54 is actually secured to the lower portion of a plate fixed which is integrally secured to the pivot shaft 56. Pivot shaft 56 is rotatably supported within outer housing 12. A cap 60 is secured to that portion of the pivot shaft 56 which extends exteriorly of the outer housing 12. A resilient seal 62 is located between the plate 58 and the lower edge of cap 60. Cap 60 is secured by bolts 64 to the inner housing 14. The cap 60 is rotatably mounted in respect to the outer housing 12. A lever 66 is integrally secured to the exterior surface of the cap 60.

The operation of the chuck assembly 10 of this invention is as follows: It will be presumed that the stem 22 of the tool is in cooperation with the central opening 20 of the shaft 16 as shown in FIG. 1 of the drawing. The balls 38 are being forced toward the stem 22 by means of wedge shaped sleeve 42. Such forcing action is effected by means of spring 50 reacting against the sleeve 42 through collar 36. As a result, the balls 38 are frictionally pressed against the stem 22 causing a secure retention of such within the shaft 16.

If it is now desired to effect removal of the tool stem 22, the operator then grasps the lever 66 and effects a 90° rotation of such to the phantom position as shown in FIG. 1. As a result, the pin 54 pivots 90° with respect to the pivot axis of the pivot shaft 56. However, it is to be noted that although the movement of the pin 54 is angular, such movement closely approaches a lineal direction. Therefore, since the pin is connected to the arm 48, the arm 48 is moved lineally in the aft direction toward the motor assembly housing 18. The head 46 of the arm 48 comes into contact with the raised portion 52 of the wedge shaped sleeve 42. As the wedge shaped sleeve 42 is also moved in the aft direction effecting a compression of the spring 50, the pressing force of the wedge shaped sleeve 42 upon the balls 38 has now been released permitting the ball 38 to move a slight distance radially outward with respect to the longitudinal opening 20. The frictional retaining force caused by balls 38 against the stem 22 has now been released and removal of stem 22 from the opening 20 is now permitted. The operator is then free to insert another stem 22 of another tool if desired.

Upon the stem of the other tool being inserted, the operator then rotates the lever 66 back to the solid position shown in FIG. 1 of the drawing. The wedge shaped sleeve 42 again comes into contact with the balls 38 resulting in a frictional contact force being established between the balls 38 and the stem 22.

What is claimed is:

1. A chuck assembly to retain the stem of a rotatable tool comprising:
   a rotatably driven shaft connected to said stem;
   a ball assembly being capable of frictionally contacting said stem in a first position to retain such within said shaft, said ball assembly being movable to a second position to permit removal and entry of said stem within said shaft;
   means to effect movement of said ball assembly into frictional contact with said stem;
   actuation means to effect operation of said means; and
   both said means being non-rotatable with respect to said shaft.

2. A chuck assembly as defined in claim 1 wherein:
   said means includes a wedge-shaped sleeve, said sleeve being continuously biased by a biasing means to maintain the frictional contact of said ball assembly with said stem.

3. A chuck assembly as defined in claim 2 wherein:
   said biasing means comprises a compression spring.

4. A chuck assembly as defined in claim 2 wherein:
   said actuation means includes an arm connected to said wedge-shaped sleeve, said arm being movable to effect movement of said wedge-shaped sleeve against said biasing means; and
   a lever assembly being connected to said arm, said lever assembly being manually operable to effect said arm movement.

5. A chuck assembly as defined in claim 4 wherein:
   said wedge-shaped sleeve includes an annular means, a head portion of said arm to cooperate with said recess.

6. A chuck assembly as defined in claim 1 wherein:
   said stem being cylindrical in configuration, said stem being locatable within a central longitudinal opening within said driven shaft.

7. A chuck assembly as defined in claim 1 wherein:
   said ball assembly being located within said driven shaft, said ball assembly including a plurality of separate balls.

8. A chuck assembly as defined in claim 7 wherein:
   said balls being formed of an extremely hard material of construction and having an outer smooth surface finish.

* * * * *